US 9,166,501 B2

(12) United States Patent
Shimada et al.

(10) Patent No.: US 9,166,501 B2
(45) Date of Patent: Oct. 20, 2015

(54) POWER SUPPLY UNIT FOR CONVERTING POWER BETWEEN DC AND AC AND OPERATING METHOD OF THE SAME

(71) Applicant: Hitachi Information & Telecommunication Engineering, Ltd., Yokohama-shi, Kanagawa (JP)

(72) Inventors: Takae Shimada, Tokyo (JP); Akihiko Kanouda, Tokyo (JP); Nobuyuki Aihara, Kanagawa (JP); Yoshihide Takahashi, Kanagawa (JP)

(73) Assignee: Hitachi Information & Telecommunication Engineering, Ltd., Yokohama-shi (JP)

( * ) Notice: Subject to any disclaimer, the term of this patent is extended or adjusted under 35 U.S.C. 154(b) by 107 days.

(21) Appl. No.: 14/050,780

(22) Filed: Oct. 10, 2013

(65) Prior Publication Data

US 2014/0104907 A1    Apr. 17, 2014

(30) Foreign Application Priority Data

Oct. 12, 2012    (JP) .................................. 2012-226616

(51) Int. Cl.
*H02M 9/00* (2006.01)
*H02M 7/5387* (2007.01)
*H02M 7/487* (2007.01)
*H02M 7/493* (2007.01)

(52) U.S. Cl.
CPC .......... *H02M 7/53871* (2013.01); *H02M 7/487* (2013.01); *H02M 7/493* (2013.01)

(58) Field of Classification Search
USPC .................... 363/34–37, 56.01, 56.02, 79–80, 363/123–127, 131–134
See application file for complete search history.

(56) References Cited

U.S. PATENT DOCUMENTS

| | | | | |
|---|---|---|---|---|
| 5,066,900 A | * | 11/1991 | Bassett | 323/224 |
| 5,255,174 A | * | 10/1993 | Murugan | 363/17 |
| 5,282,103 A | * | 1/1994 | Hatch et al. | 360/245 |
| 5,552,681 A | * | 9/1996 | Suzuki et al. | 318/139 |
| 5,633,577 A | * | 5/1997 | Matsumae et al. | 322/37 |
| 5,710,699 A | * | 1/1998 | King et al. | 363/132 |
| 5,963,436 A | * | 10/1999 | Yoshida | 363/17 |
| 6,081,434 A | * | 6/2000 | Kinoshita et al. | 363/24 |
| 6,304,461 B1 | * | 10/2001 | Walker | 363/17 |
| 6,320,358 B2 | * | 11/2001 | Miller | 323/222 |

(Continued)

FOREIGN PATENT DOCUMENTS

| | | |
|---|---|---|
| JP | 9-140157 A | 5/1997 |
| JP | 2002-78350 A | 3/2002 |

*Primary Examiner* — Adolf Berhane
*Assistant Examiner* — Nusrat Quddus
(74) *Attorney, Agent, or Firm* — Crowell & Moring LLP

(57) ABSTRACT

A highly efficient power supply unit compatible with a single-phase three-wire system and an operating method of such a power supply unit are provided. The power supply unit includes first and second switching legs connected in parallel to a first capacitor leg with a DC power supply connected thereto. One end of the second capacitor leg is connected to the middle point of the first switching leg through a first inductor, and the other end is connected to the middle point of the second switching leg through a second inductor. The two ends of the second capacitor leg and the middle point of the second capacitor leg are defined as AC terminals. A switch is provided between middle points of first and second capacitor legs. A control part sets the switch to OFF when power is input/output only between one end of the second capacitor leg and the other end.

23 Claims, 5 Drawing Sheets

(56) References Cited

U.S. PATENT DOCUMENTS

| | | | |
|---|---|---|---|
| 6,370,050 B1* | 4/2002 | Peng et al. | 363/98 |
| 6,452,815 B1* | 9/2002 | Zhu et al. | 363/17 |
| 6,452,816 B2* | 9/2002 | Kuranuki et al. | 363/17 |
| 6,512,352 B2* | 1/2003 | Qian | 323/282 |
| 7,177,163 B2* | 2/2007 | Eguchi et al. | 363/17 |
| 7,239,114 B2* | 7/2007 | Dürbaum et al. | 323/224 |
| 7,557,546 B2* | 7/2009 | Uruno et al. | 323/259 |
| 7,599,198 B2* | 10/2009 | Tao et al. | 363/17 |
| 7,612,602 B2* | 11/2009 | Yang et al. | 327/494 |
| 7,692,935 B2* | 4/2010 | Yamauchi et al. | 363/16 |
| 7,706,156 B2* | 4/2010 | Hsieh et al. | 363/21.02 |
| 7,796,405 B2* | 9/2010 | Popescu et al. | 363/17 |
| 7,826,236 B2* | 11/2010 | Dishman et al. | 363/21.03 |
| 7,986,535 B2* | 7/2011 | Jacobson et al. | 363/17 |
| 2002/0113581 A1* | 8/2002 | Eagar et al. | 323/282 |
| 2002/0185993 A1* | 12/2002 | Qian | 323/282 |
| 2004/0066094 A1* | 4/2004 | Suzuki et al. | 307/18 |
| 2004/0136209 A1* | 7/2004 | Hosokawa et al. | 363/24 |
| 2006/0139823 A1* | 6/2006 | Shoji et al. | 361/56 |
| 2007/0216319 A1* | 9/2007 | Wai et al. | 315/247 |
| 2008/0196950 A1* | 8/2008 | Stancu et al. | 180/65.1 |
| 2008/0309301 A1* | 12/2008 | Shimada et al. | 323/282 |
| 2009/0059622 A1* | 3/2009 | Shimada et al. | 363/17 |
| 2010/0052423 A1* | 3/2010 | Shimada et al. | 307/43 |
| 2011/0019440 A1* | 1/2011 | Shimada et al. | 363/17 |
| 2012/0098341 A1* | 4/2012 | Shimada et al. | 307/43 |
| 2012/0300502 A1* | 11/2012 | Shimada et al. | 363/17 |
| 2013/0100707 A1* | 4/2013 | Hatakeyama et al. | 363/17 |

* cited by examiner (a1) (a2)

(b1) (b2)

POWER SUPPLY UNIT FOR CONVERTING POWER BETWEEN DC AND AC AND OPERATING METHOD OF THE SAME

CLAIM OF PRIORITY

The present application claims priority from Japanese application serial no. 2012-226616, filed on Oct. 12, 2012, the content of which is hereby incorporated by reference into this application.

FIELD OF THE INVENTION

The present invention relates to a power supply unit for converting power between DC and AC, and to an operating method of such a power supply unit.

BACKGROUND OF THE INVENTION

With the recent increase in awareness of global environmental protection, systems with a power supply, such as a storage battery, a solar cell, and a fuel cell, have been developed. Such systems require a power supply unit so that DC power is converted into AC power and supplied to a load and commercial power supply. Further, in order to charge the storage battery from the commercial power supply, it is necessary to supply power to the storage battery by converting the AC power of the commercial power supply into DC power.

Patent document 1 (Japanese Unexamined Patent Application Publication No. 2002-78350) discloses an AC/DC bidirectional converter of a single-phase three-wire system. This converter allows for both charging from a single-phase three-wire AC power supply to a battery, and electric power regeneration of the single-phase three-wire AC power supply by the discharge of the battery by a single circuit, thereby achieving downsizing and low cost.

Patent document 2 (Japanese Unexamined Patent Application Publication No. 1997-140157) discloses an inverter unit using a solar cell that can switch between operation of interconnection with the commercial power system and self-sustained operation by a single inverter.

However, in the conventional single-phase three-wire AC/DC bidirectional converter described in Patent document 1, when the battery is charged from AC 100 V, the input current passes through two semiconductor devices such as a switching element and a diode. Thus, the conduction loss increases and it is difficult to achieve high efficiency. In addition, in the power regeneration of the single-phase three-wire AC power supply by the discharge of the battery, four switching elements are turned on and off. Thus, the switching loss increases and it is difficult to achieve high efficiency.

Further, in the conventional inverter unit using a solar cell described in Patent document 2, there is no disclosure of the technology of power supply both to the load of AC 100 V and the load of AC 200 V at the same time during a self-sustained operation.

Accordingly, an object of the present invention is to provide a highly efficient power supply unit compatible with the single-phase three-wire system, and an operation method of such a power supply unit.

SUMMARY OF THE INVENTION

In order to achieve the above object, the present invention provides a power supply unit including: a first switching leg in which a first switching element and a second switching element are connected in series; a second switching leg in which a third switching element and a fourth switching element are connected in series, while also being connected to the first switching leg in parallel; a first capacitor leg in which a first capacitor and a second capacitor are connected in series, while also being connected to the first switching leg in parallel; a second capacitor leg in which a third capacitor and a fourth capacitor are connected in series, with the series connection point of the third and fourth capacitors being connected to the series connection point of the first and second capacitors; a first inductor connected between the series connection point of the first and second switching elements, and one end of the second capacitor leg; a second inductor connected between the series connection point of the third and fourth switching elements, and the other end of the second capacitor leg; and a control part for controlling the on/off state of the first to fourth switching elements. A DC power supply is connected to the first capacitor and/or the second capacitor and/or the first capacitor leg in parallel. One end of the second capacitor leg is defined as a first AC terminal, the other end of the second capacitor leg is defined as a second AC terminal, and the series connection point of the third and fourth capacitors is defined as a third AC terminal. Further, a switch is inserted between the series connection point of the first and second capacitors, and the series connection point of the third and fourth capacitors. The control part sets the switch to the OFF state when power is input/output only between the first and second AC terminals of the second capacitor leg.

According to the present invention, it is possible to provide a highly efficient power supply unit compatible with the single-phase three-wire system.

DETAILED DESCRIPTION OF THE PREFERRED EMBODIMENT

Hereinafter, a preferred embodiment of the present invention will be described in detail with reference to the accompanying drawings.

Embodiment

Figure 1:
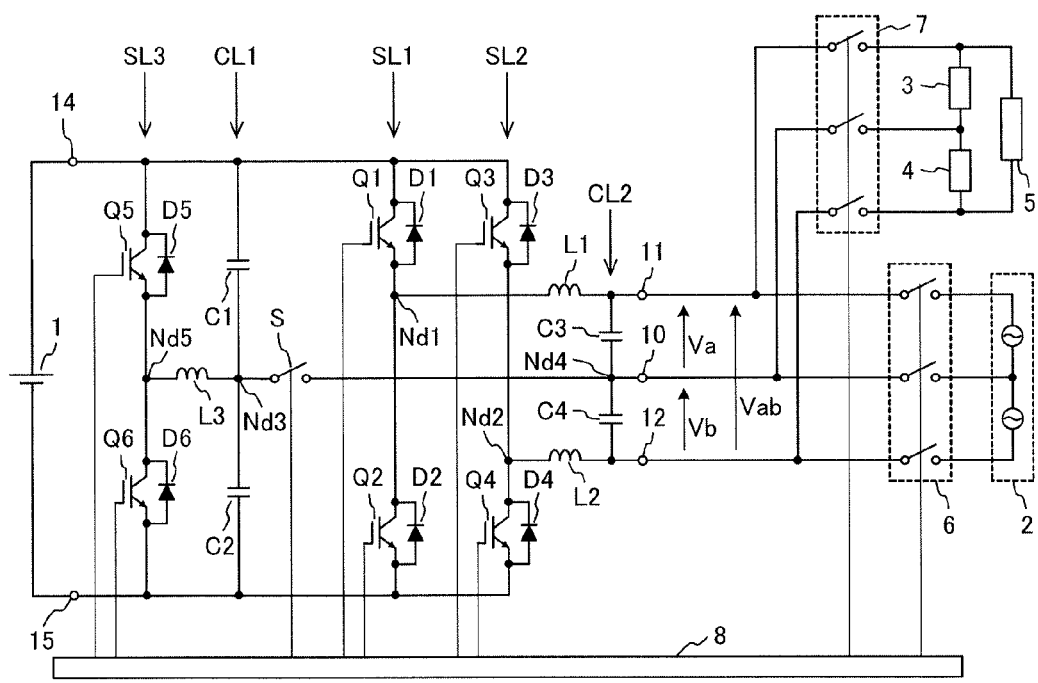
FIG. 1 is a circuit block diagram of a power supply unit according to the present invention.

FIG. 1 is a circuit block diagram of a power supply unit according to an embodiment of the present invention. The power supply unit is connected between a DC power supply 1 and an AC power supply 2 to exchange power between the two power lines. Further, the power supply unit supplies power to AC loads 3 to 5. The AC power supply 2 is a single-phase three-wire system that can supply two 100 V systems and one 200 V system. Note that a voltage of about 85 V to 132 V is widely used for the 100 V system, and a voltage of about 170 V to 265 V is widely used for the 200 V system. In the present embodiment, it is assumed that the AC loads 3, 4 are the loads of the 100 V system and that the AC load 5 is the load of the 200 V system.

The power supply unit includes: a first switching leg SL1 in which a switching elements Q1 and Q2 are connected in series by a node Nd1; a second switching leg SL2 in which switching elements Q3 and Q4 are connected in series by a node Nd2; a first capacitor leg CL1 in which capacitors C1 and C2 are connected in series by a node Nd3; a second capacitor leg CL2 in which capacitors C3 and C4 are connected in series by a node Nd4; and a third switching leg SL3 in which switching elements Q5 and Q6 are connected in series by a node Nd5.

The first to third switching legs SL1, SL2, SL3 and the first capacitor leg CL1 are connected in parallel.

An inductor L1 is connected between one end (the capacitor C3) of the second capacitor leg CL2, and the node Nd1. An inductor L2 is connected between the other end (the capacitor C4) of the second capacitor leg CL2, and the node Nd2. Then, an inductor L3 is connected between the node Nd3 and the node Nd5.

Further, the node Nd3 and the node Nd4 are connected together with a switch S between them.

Note that diodes D1 to D6 are connected in inverse-parallel to the switching elements Q1 to Q6, respectively. Here, when the MOSFET is used as the switching elements Q1 to Q6, it is possible to use the parasitic diode of MOSFET, so that the diodes D1 to D6 can be omitted.

The series connection point of the capacitors C3 and C4 is defined as an AC terminal 10, the connection point of the inductor L1 and the capacitor C3 is defined as an AC terminal 11, and the connection point of the inductor L2 and the capacitor C4 is defined as an AC terminal 12. The phase between the AC terminals 11 and 10, or the phase between the two ends of the capacitor 3 is defined as the a-phase. The phase between the AC terminals 10 and 12, or the phase between the two ends of the capacitor C4 is defined as the b-phase. Then, the phase between the AC terminals 11 and 12, or the phase between the two ends of the second capacitor leg CL2 is defined as the ab-phase.

Further, the voltage of the AC terminal 11 with respect to the AC terminal 10 is defined as the a-phase voltage Va, the voltage of the AC terminal 10 with respect to the AC terminal 12 is defined as the b-phase voltage Vb, and the voltage of the AC terminal 11 with respect to the AC terminal 12 is defined as the ab-phase voltage Vab. In this embodiment, the a-phase voltage Va, the b-phase voltage Vb, and the ab-phase voltage Vab are collectively referred to as the phase voltage.

The first capacitor leg CL1, and the first to third switching legs SL1, SL2, SL3 are connected in parallel between positive and negative terminals 14, 15 of the DC power supply 1. Note that when the diode D is connected in inverse-parallel to the switching element Q, the cathode of the diode is connected to the positive terminal 14 side of the DC power supply 1, and the anode of the diode is connected to the negative terminal 15 side of the DC power supply 1.

The AC power supply 2 is connected to the AC terminals 10 to 12 through a relay contact 6 so that the AC terminal 10 is connected to a neutral line of the single-phase three-wire system. Further, the AC loads 3, 4, and 5 are connected to the a-phase, the b-phase, and the ab-phase through a relay contact 7, respectively.

The ON/OFF of the switching elements Q1 to Q6, the switch S, and the relay contacts 6, 7 are controlled by a control part 8.

The capacitors C1, C2 divide the voltage of the DC power supply 1 to generate an intermediate voltage of the DC power supply 1 for the node Nd3 of the first capacitor leg CL1. The switching elements Q5, Q6, and the inductor L3 balance the voltage sharing between the capacitors C1, C2 by controlling the switching elements Q5, Q6. In the present embodiment, the DC power supply 1 is connected in parallel to the first capacitor leg CL1. However, a DC power supply of about half the voltage of the DC power supply 1 may be connected to one or both of the capacitors C1 and C2 in parallel.

When power is supplied from the DC power supply 1 to the AC power supply 2 and to the AC loads 3 to 5, it is designed to supply power from the capacitors C1, C2 to the capacitors C3, C4 by controlling the switching elements Q1 to Q4. On the other hand, when the DC power supply 1 is charged from the AC power supply 2, it is designed to supply power from the capacitors C3, C4 to the capacitor C1, C2.

The description below shows the operation of power conversion between the capacitors C1, C2 and the capacitors C3, C4. Note that the half cycle of the commercial frequency, in which the phase voltage is positive, will be described here. The half cycle of the commercial frequency, in which the phase voltage is negative, can be easily understood by taking into account the fact that the potential of the nodes Nd1, Nd2 can be higher or lower than the node Nd4, by selecting which of the switching elements Q1 and Q2 is to be turned on and by selecting which of the switching elements Q3 and Q4 is to be turned on.

Figure 2:
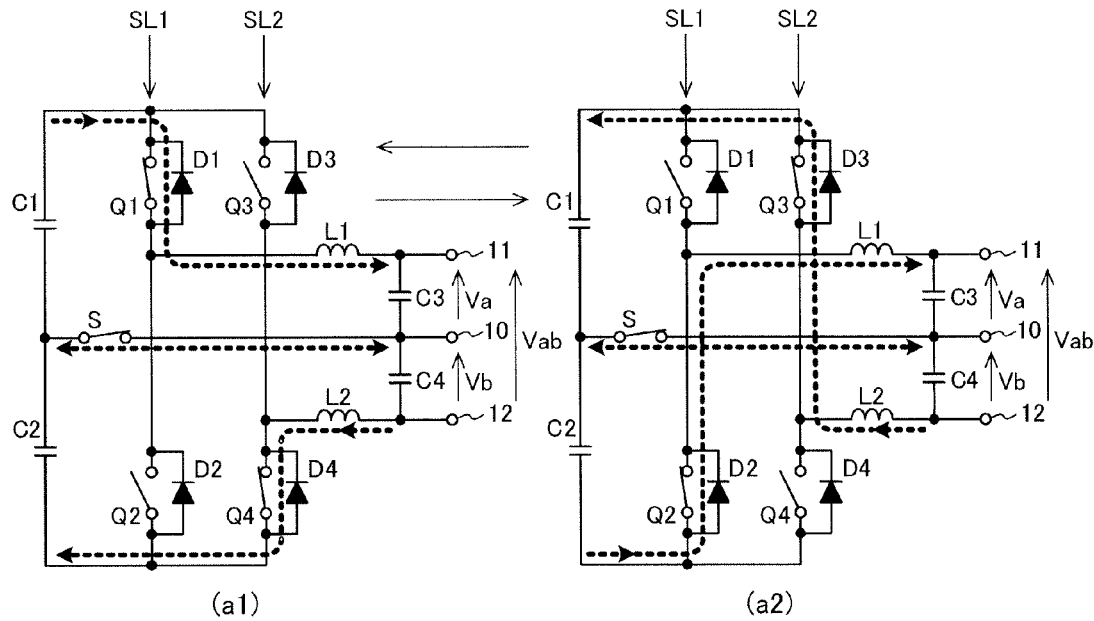
FIG. 2 shows the circuit operation of a discharging operation 1.

First, as the discharging operation 1, the operation for outputting AC 100 V/AC 200 V will be described with reference to FIG. 2. The description here will show the discharging operation 1 for supplying power to the capacitors C3, C4 from the capacitors C1, C2, outputting AC 100 V to both the a-phase and the b-phase, and thereby outputting AC 200 V to the ab-phase.

In the discharging operation 1, the switch S is fixed at the ON state to allow the switching elements Q1 to Q4 to operate, respectively. The switching operation performs a mode a1 for setting the switching element Q1 on the positive terminal side of the first switching leg SL1, as well as the switching element Q4 on the negative terminal side of the second switching leg SL2 to the ON state, while setting the other switching elements to the OFF state. Further, the switching operation performs a mode a2 for setting the switching element Q2 on the negative terminal side of the first switching leg SL1, as well as the switching element Q3 on the positive terminal side of the second switching leg SL2 to the ON state, while setting the other switching elements to the OFF state. The switching operation performs the modes a1 and a2 alternately. FIG. 2 shows the circuit configuration, the current direction, and the like in the modes a1 and a2, in which the left side of FIG. 2 shows the mode a1 and the right side of FIG. 2 shows the mode a2.

In the mode a1, the switching element Q1 is in the ON state, in which the voltage of the capacitor C1 is applied to the inductor L1 and the capacitor C3. Further, the switching element Q4 is in the ON state, in which the voltage of the capacitor C2 is applied to the inductor L2 and the capacitor C4. The current of the inductors L1, L2 increases with time. Then, the current is supplied to the capacitors C3 and C4.

When the operation moves to the mode a2 from the mode a1 and the switching element Q1 is turned off, the current of the inductor L1 flowing through the switching element Q1 is commutated to the diode D2. Then, the current flows back through the capacitor C2. At this time, the switching element Q2 is turned on.

Further, when the switching element Q4 is turned off, the current of the inductor L2 flowing through the switching element Q4 is commutated to the diode D3. Then, the current flows back through the capacitor C1. At this time, the switching element Q3 is turned on. The current of the inductors L1, L2 gradually decreases with time. Then, the current is supplied to the capacitors C3 and C4.

After that, the switching elements Q2, Q3 are turned off and the switching elements Q1, Q4 are turned on. Then, the operation returns to the mode a1.

Note that when the current of the inductor L1 and the current of the inductor L2 are different from each other, the difference between the two currents flows through the switch S.

As described above, the switching operation between the modes a1 and a2 is continuously performed to supply power from the capacitors C1, C2 to the capacitors C3, C4. In this way, it is possible to output AC 100 V to both the a-phase and the b-phase, and then output AC 200 V to the ab-phase.

Next, the operation for outputting AC 100 V will be described as the discharging operation 2 with reference to FIG. 3. The description here will show the discharging operation 2 for supplying power to the capacitor C3 from the capacitor C1 and for outputting AC 100 V to the a-phase (or the b-phase).

In the discharging operation 2, the switch S is fixed at the ON state to operate the switching element Q of either one of the first switching leg SL1 and the second switching leg SL2, while setting the switching element of the other switching leg SL to the OFF state to prevent it from operating. The first switching leg SL1 is operated in order to output AC 100 V to the a-phase. While the second switching leg SL2 is operated in order to output AC 100 V to the b-phase.

Here is an example of the former case. At this time, the switching operation performs a mode b1 for setting the switching element Q1 on the positive terminal side of the first switching leg SL1 to the ON state, while setting the other switching element to the OFF state. Further, the switching operation performs a mode b2 for setting the switching element Q2 on the negative terminal side of the first switching leg SL1 to the ON state, while setting the other switching element to the OFF state. The switching operation performs the modes b1 and b2 alternately. FIG. 3 shows the circuit configuration, the current direction, and the like in the modes b1 and b2, in which the left side of FIG. 3 shows the mode b1 and the right side of FIG. 3 shows the mode b2.

Figure 3:
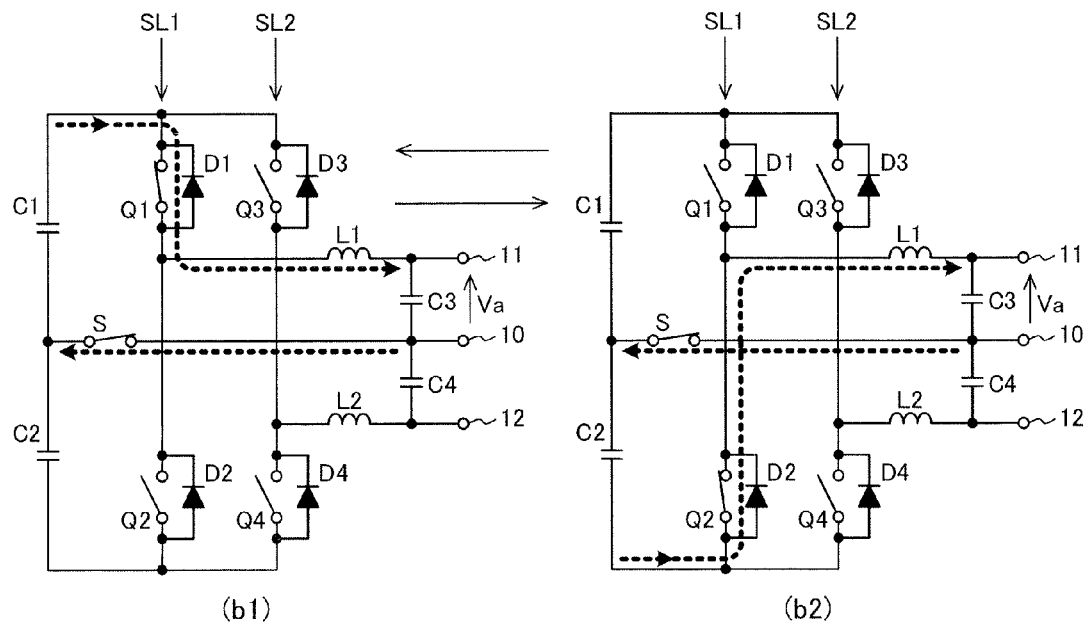
FIG. 3 shows the circuit operation of a discharging operation 2.

In the mode b1 on the left side of FIG. 3, only the switching element Q1 is in the ON state. In this state, the voltage of the capacitor C1 is applied to the inductor L1 and the capacitor C3. The current of the inductor L1 increases with time. Then, the current is supplied to the capacitor C3.

In the mode b2 on the right side of FIG. 3 with the switching element Q1 turned off, the current of the inductor L1 flowing through the switching element Q1 is commutated to the diode D2. Then, the current flows back through the capacitor C2. At this time, the switching element Q2 is turned on. The current of the inductor L1 decreases with time. Then the current is supplied to the capacitor C3.

After that, the switching element Q2 is turned off and the switching element Q1 is turned on. Then, the operation returns to the mode b1.

Note that in order to supply power to the capacitor C4 from the capacitor C2 to output AC 100 V to the b-phase, the switch S is fixed at the ON state to allow the switching elements Q3 and Q4 to operate.

As described above, the switching operation between the modes b1 and b2 is continuously performed to supply power to the capacitor C3 from the capacitor C1. In this way, it is possible to output AC 100 V only to the a-phase.

Next, the operation for outputting AC 200 V will be described as the discharging operation 3 with reference to FIG. 4. The description here will show the operation for supplying power to the capacitors C3, C4 from the capacitors C1, C2, and for outputting AC 200 V to the ab-phase.

In the discharging operation 3, the switch S is fixed at the OFF state, in which one switching element Q of the first switching leg SL1 is maintained in the ON state while the other switching element Q is maintained in the OFF state. In this state, the two serial switching elements Q3, Q4 of the second switching leg SL2 are alternately turned on and off.

At this time, the switching operation performs a mode c1 for setting the element Q1 on the positive terminal side of the first switching leg SL1, as well as the switching element Q4 on the negative terminal side of the second switching leg SL2 to the ON state, while setting the other switching elements to the OFF state. The switching operation performs the modes c1 and c2 alternately. Further, the switching operation performs a mode c2 for setting the switching element Q1 on the positive terminal side of the first switching leg SL1, as well as the switching element Q3 on the positive terminal side of the second switching leg SL2 to the ON state, while setting the other switching elements to the OFF state. FIG. 4 shows the circuit configuration, the current direction, and the like in the modes c1 and c2, in which the left side of FIG. 4 shows the mode c1 and the right side of FIG. 4 shows the mode c2.

Figure 4:
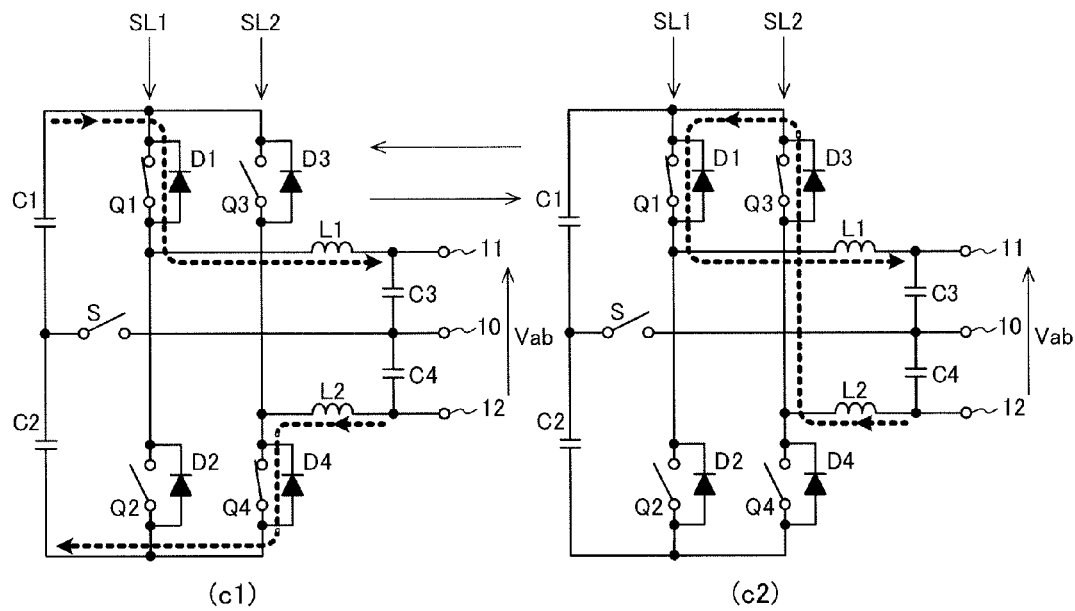
FIG. 4 shows the circuit operation of a discharging operation 3.

In the mode c1 on the left side of FIG. 4, the switching elements Q1, Q4 are in the ON state. In this state, the voltages of the capacitors C1, C2 are applied to the inductors L1, L2 and the capacitors C3, C4. The current of the inductors L1, L2 increases with time. Then, the current is supplied to the capacitors C3 and C4.

In the mode c2 on the right side of FIG. 4 with the switching element Q4 turned off, the current of the inductors L1, L2 flowing through the switching element Q4 is commutated to the diode D3. At this time, the switching element Q3 is turned on. The current of the inductors L1, L2 decreases with time. Then, the current is supplied to the capacitors C3 and C4.

After that, the switching element Q3 is turned off and the switching element Q4 is turned on. Then, the operation returns to the mode a1.

As described above, in the discharging operation 3, the switching element Q1 is fixed at the ON state in the half cycle of the commercial frequency in which the phase voltage is positive. In this state, the switching elements Q3, Q4 are switched on and off. Note that in the half cycle of the commercial frequency in which the phase voltage is negative, the switching element Q2 is fixed at the ON state to allow the switching elements Q3, Q4 to be switched on and off. Off course, it is also possible that the switching element Q3 or Q4 is fixed at the ON state to allow the switching elements Q1, Q2 to be switched on and off.

Further, the current of the inductor L1 and the current of the inductor L2 are equal because the switch S is fixed at the OFF state.

As described above, the switching operation between the modes c1 and c2 is continuously performed to supply power to the capacitors C3, C4 from the capacitors C1, C2. In this way, it is possible to output AC 200 V to the ab-phase.

The discharging operation has been described with reference to FIGS. 2, 3, and 4. Here, the relationship between each of the discharging operations and the open/closed state of the switch S is sorted out. First, the discharging operations 1 and 2 shown in FIGS. 2 and 3 are the case of obtaining the AC reference voltage (AC 100 V). In this case, the open/closed state of the switch S is set to the ON state. On the other hand, the discharging operation 3 shown in FIG. 4 is the case of obtaining only the double AC voltage (AC 200 V). In this case, the open/closed state of the switch S is set to the OFF state.

Next, the charging operation will be described. In the description, the charging operation is divided into four cases.

First, the charging operation 1 charges the capacitors C1, C2 with the input voltages of AC 100/200 V.

The charging operation 1 will be described with reference to FIG. 5, in which power is supplied to the capacitors C1, C2 from the capacitors C3, C4, to input AC 100 V from both the a-phase and the b-phase and thereby input AC 200 V from the ab-phase.

In the charging operation 1, the switch S is fixed at the ON state to allow the switching elements Q1 to Q4 to operate. The switching operation performs a mode A1 for setting the switching element Q2 on the negative terminal side of the first switching leg SL1, as well as the switching element Q3 on the positive terminal side of the second switching leg SL2 to the ON state, while setting the other switching elements to the OFF state. Further, the switching operation performs a mode A2 for setting the switching element Q1 on the positive terminal side of the first switching leg SL1, as well as the switching element Q4 on the negative terminal side of the second switching leg SL2 to the ON state, while setting the other switching elements to the OFF state. The switching operation performs the modes A1 and A2 alternately. FIG. 5 shows the circuit configuration, the current direction, and the like in the modes A1 and A2, in which the left side of FIG. 5 shows the mode A1 and the right side of FIG. 5 shows the mode A2.

In the mode A1, the switching element Q2 is in the ON state, in which the voltage of the capacitor C3 is applied to the inductor L1 through the capacitor C2. Further, the switching element Q3 is in the ON state, in which the voltage of the capacitor C4 is applied to the inductor L2 through the capacitor C1. The energy of the capacitors C3, C4 is accumulated in the inductors L1, L2.

In the mode A2, when the switching element Q2 is turned off, the current of the inductor L1 flowing through the switching element Q2 is commutated to the diode D1. Then, the current is supplied to the capacitor C1. At this time, the switching element Q1 is turned on. Further, when the switching element Q3 is turned off, the current of the inductor L2 flowing through the switching element Q3 is commutated to the diode D4, which is then supplied to the capacitor C2. At this time, the switching element Q4 is turned on. The current of the inductors L1, L2 decreases with time.

After that, the switching elements Q1, Q4 are turned off and the switching elements Q2, Q3 are turned on. Then, the operation returns to the mode A1. Note that if the current of the inductor L1 and the current of the inductor L2 are different, the difference of the two currents flows through the switch S.

As described above, the switching operation between the modes A1 and A2 is continuously performed, so that it is possible to supply power to the capacitors C1, C2 from the capacitors C3, C4. At this time, AC 100 V is applied to both the a-phase and the b-phase, and AC 200 V is applied to the ab-phase.

Figure 6:
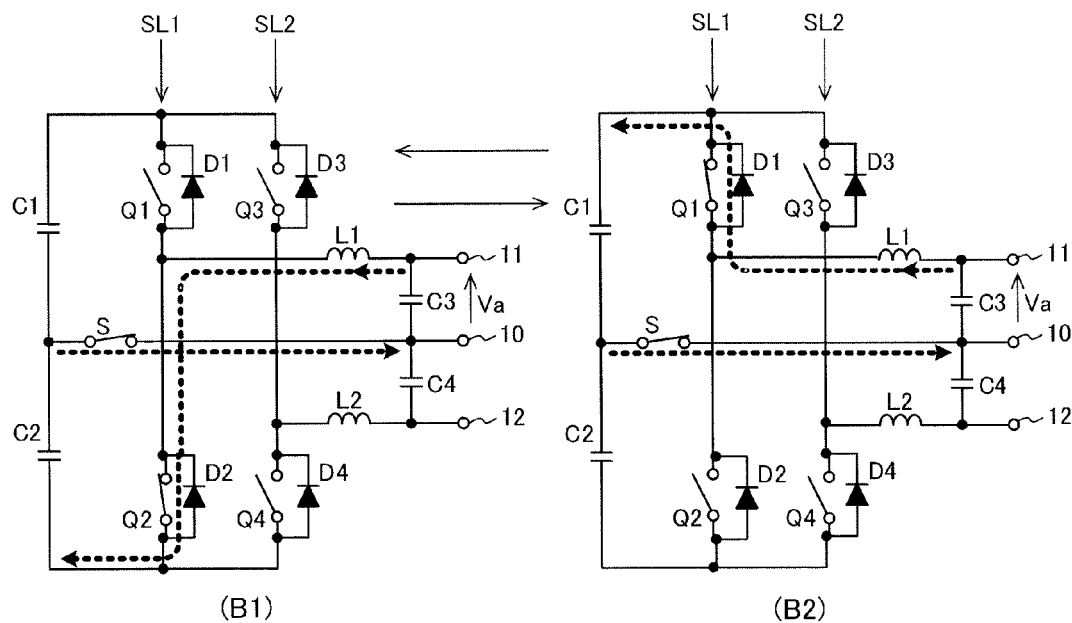
FIG. 6 shows the circuit operation of a charging operation 2.

Next, the operation for applying AC 100 V will be described as the charging operation 2 with reference to FIG. 6. The description here will show the charging operation 2, in which power is supplied to the capacitor C1 from the capacitor C3 with AC 100 V being applied to the a-phase (or the b-phase).

In the charging operation 2, the switch S is fixed at the ON state to operate the switching element Q of either one of the first switching leg and the switching leg SL2, while setting the switching element Q of the other switching leg SL to the OFF state to prevent it from operating. The operation allows the part of the first switching leg 1 to operate in order to charge the battery by applying AC 100 V to the a-phase. The operation allows the part of the second switching leg SL2 to operate in order to charge the battery by applying AC 100 V to the b-phase.

Here is an example of the former case. At this time, the switching operation performs a mode B1 for setting the switching element Q2 on the negative side of the first switching leg SL1 to the ON state, while setting the other switching element to the OFF state. Further, the switching operation performs a mode B2 for setting the switching element Q1 on the positive terminal side of the first switching leg SL1 to the ON state, while setting the other switching element to the OFF state. The switching operation performs the modes B1 and B2 alternately. FIG. 6 shows the circuit configuration, the current direction, and the like in the modes B1 and B2, in which the left side of FIG. 6 shows the mode B1 and the right side of FIG. 6 shows the mode B2.

In the mode B1, the switching element Q2 is in the ON state, in which the voltage of the capacitor C3 is applied to the inductor L1 through the capacitor C2. The energy of the capacitor C3 is accumulated in the inductor L1.

In the mode B2, when the switching element Q2 is turned off, the current of the inductor L1 flowing through the switching element Q2 is commutated to the diode D1. Then, the current is supplied to the capacitor C1. At this time, the switching element Q1 is turned on. The current of the inductor L1 decreases with time.

After that, the switching element Q1 is turned off and the switching element Q2 is turned on. Then, the operation returns to the mode B1.

Note that when power is supplied to the capacitor C2 from the capacitor C4 to input AC 100 V from the b-phase, the switch S is fixed at the ON state to allow the switching elements Q3 and Q4 to operate.

As described above, the switching operation between the modes B1 and B2 is continuously performed to supply power to the capacitor C1 from the capacitor C3. In this way, it is possible to charge the battery with AC 100 V being applied only to the a-phase.

Figure 7:
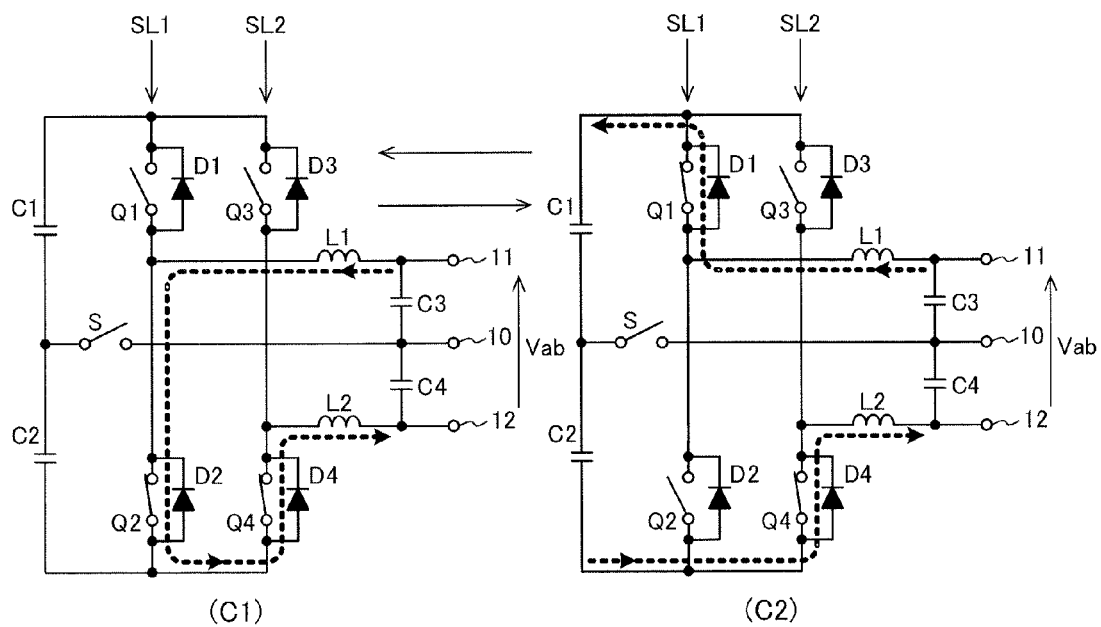
FIG. 7 shows the circuit operation of a charging operation 3.

Next, the operation with only AC 200 V being applied will be described as the charging operation 3 with reference to FIG. 7. The description here will show the operation for supplying power to the capacitors C1, C2 from the capacitors C3, C4.

In the charging operation 3, the switch S is fixed at the OFF state. At this time, one switching element Q of the second switching leg SL2 is set to the ON state while the other switching element is maintained in the OFF state. Further, the two serial switching elements Q1, Q2 of the first switching leg SL1 are alternately turned on and off.

At this time, the switching operation performs a mode C1 for setting the switching element Q2 on the negative terminal side of the first switching leg SL1, as well as the switching element Q4 on the negative terminal side of the second switching leg SL2 to the ON state, while setting the other switching elements to the OFF state. Further, the switching operation performs a mode C2 for setting the switching element Q1 on the positive terminal side of the first switching leg SL1, as well as the switching element Q4 on the negative terminal side of the second switching leg SL2 to the ON state, while setting the other switching elements to the OFF state. The switching operation performs the modes C1 and C2 alternately. FIG. 7 shows the circuit configuration, the current direction, and the like in the modes C1 and C2, in which the left side of FIG. 7 shows the mode C1 and the right side of FIG. 7 shows the mode C2.

In the mode C1, the switching elements Q2, Q4 are in the ON state, in which the voltage of the capacitors C3, C4 are applied to the inductors L1, L2. The energy of the capacitors C3, C4 is accumulated in the inductors L1, L2.

In the mode C2, when the switching element Q2 is turned off, the current of the inductors L1, L2 flowing through the switching element Q2 is commutated to the diode D1. Then, the current is supplied to the capacitors C1, C2. At this time, the switching element Q1 is turned on. The current of the inductors L1, L2 decreases with time.

After that, the switching element Q1 is turned off and the switching element Q2 is turned on. Then, the operation returns to the mode C1.

As described above, in the charging operation 3, in the half cycle of the commercial frequency with the phase voltage being positive, the switching element Q4 is fixed at the ON state to allow the switching elements Q1, Q2 to be switched on and off. Note that in the half cycle of the commercial frequency with the phase voltage being negative, the switching element Q3 is fixed at the ON state to allow the switching elements Q1, Q2 to be switched on and off. Of course, it is also possible that either the switching element Q1 or Q2 is fixed at the ON state to allow the switching elements Q3, Q4 to be switched on and off. In the charging operation 3, the current of the inductor L1 and the current of the inductor L2 are equal because the switch S is fixed to the OFF state.

As described above, the switching operation between the modes C1 and C2 is continuously performed to supply power to the capacitors C1, C2 from the capacitors C3, C4. In this way, it is possible to charge the battery with AC 200 V being applied to the ab-phase.

Next, the operation with only AC 200 V being applied will be described as the charging operation 4 with reference to FIG. 8. The description here will show the operation for supplying power to the capacitors C1, C2 from the capacitors C3, C4. The charging operation 4 is the operation in which the charging operation 1 shown in FIG. 5 is performed with the switch S being fixed at the OFF state.

In the charging operation 4, the switch S is fixed at the OFF state to allow the switching elements Q1 to Q4 to operate. The switching operation performs a mode E1 for setting the switching element Q2 on the negative terminal side of the first switching leg SL1, as well as the switching element Q3 on the positive side of the second switching leg SL2 to the ON state, while setting the other switching elements to the OFF state. Further, the switching operation performs a mode E2 for setting the switching element Q1 on the positive terminal side of the first switching leg SL1, as well as the switching element Q4 on the negative terminal side of the second switching leg SL2 to the ON state, while setting the other switching elements to the ON state. The switching operation performs the modes E1 and E2 alternately. FIG. 8 shows the circuit configuration, the current direction, and the like in the modes E1 and E2, in which the left side of FIG. 8 shows the mode E1 and the right side of FIG. 8 shows the mode E2.

In the mode E1, the switching element Q2 is in the ON state, in which the voltage of the capacitor C3 is applied to the inductor L1 through the capacitor C2. Further, the switching element Q3 is in the ON state, in which the voltage of the capacitor C4 is applied to the inductor L2 through the capacitor C1. The energy of the capacitors C3, C4 is accumulated in the inductors L1, L2.

In the mode E2, when the switching element Q2 is turned off, the current of the inductor L1 flowing through the switching element Q2 is commutated to the diode D1. Then, the current is supplied to the capacitor C1. At this time, the switching element Q1 is turned on. Further, when the switching element Q3 is turned off, the current of the inductor L2 flowing through the switching element Q3 is commutated to the diode D4. Then, the current is supplied to the capacitor C2. At this time, the switching element Q4 is turned on. The current of the inductors L1, L2 decreases with time.

After that, the switching elements Q1, Q4 are turned off and the switching elements Q2, Q3 are turned on. Then, the operation returns to the mode E1.

As described above, the switching operation between the modes E1 and E2 is continuously performed to supply power to the capacitors C1, C2 from the capacitors C3, C4. At this time, AC 100 V is applied to both the a-phase and the b-phase, and AC 200 V is applied to the ab-phase.

Figure 5:
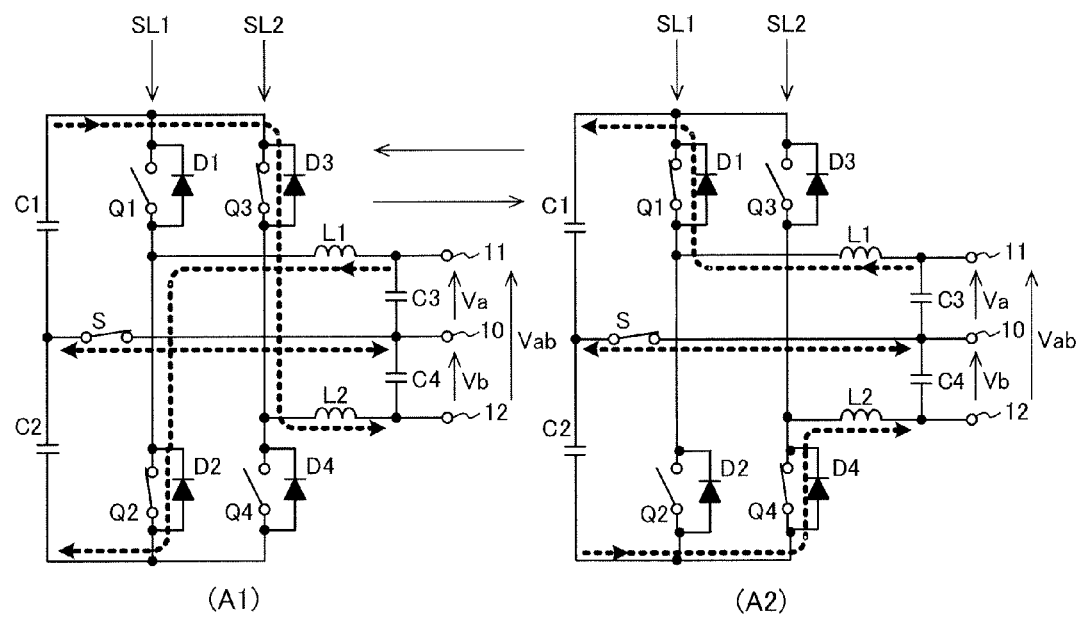
FIG. 5 shows the circuit operation of a charging operation 1.
Figure 8:
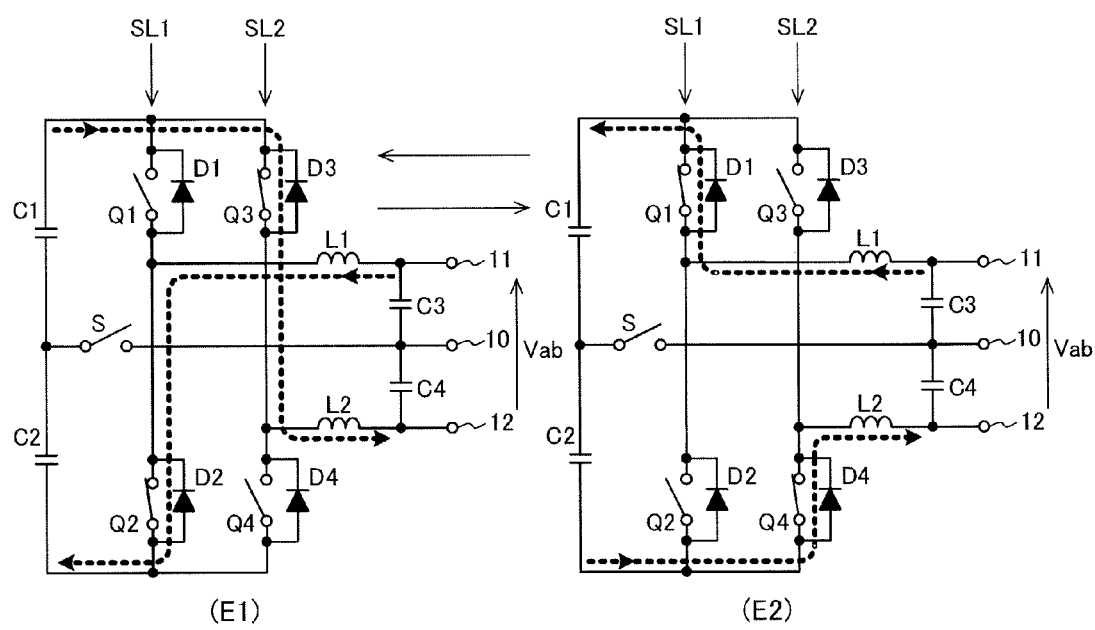
FIG. 8 shows the circuit operation of a charging operation 4.

In the charging operation 4 shown in FIG. 8, the current of the inductor L1 (a-phase) and the current of the inductor L2 (b-phase) are in principle equal, compared to the charging operation 1 shown in FIG. 5. The advantages of the example shown in FIG. 8 are that the amount of calculation to control the input current to have a sine wave for the improvement of the input power factor is likely to be reduced, and that EMC noise is likely to be reduced because the ground potential of the DC line to which the capacitors C1, C2 are connected is not likely to vary, compared to the charging operation 3 shown in FIG. 7.

The charging operations have been described with reference to FIGS. 5, 6, 7, and 8. Here, the relationship between each of the charging operations and the open/closed state of the switch S is sorted out. First, the charging operations 1, 2 in FIGS. 5, 6 are the case of charging with the AC reference voltage (AC 100 V) being applied. In this case, the open/closed state of the switch S is set to the ON state. On the other hand, the charging operations 3, 4 shown in FIGS. 7, 8 are the case of charging with only the double AC voltage (AC 200 V) being applied. In this case, the open/closed state of the switch S is set to the OFF state.

As described above, the power supply unit according to the present embodiment includes a single-phase three-wire inverter circuit with two half bridge inverters when the switch S is set to the ON state. One of the half bridge inverters includes the switching elements Q1, Q2, the inductor L1, and the capacitor C3. The other half bridge inverter includes the switching elements Q3, Q4, the inductor L2, and the capacitor C4. With this configuration, the power supply unit according to the present embodiment allows the charging and discharging operations with the input/output voltage of AC reference voltage (AC 100 V).

On the other hand, when the switch S is set to the OFF state, the power supply unit includes a single-phase two-wire inverter circuit with a full bridge inverter including the switching elements Q1, Q2, Q3, Q4, the inductors L1, L2, and the capacitors C3, C4. With this configuration, the power supply unit according to the present embodiment allows the charging and discharging operations with the input/output voltage of only the double AC voltage (AC 200 V).

Hereinafter, the selection method of the discharging operations 1, 2, 3 will be described. First, when power is output to two or more of the a-phase, b-phase, and ab-phase, such as when the relay contact 6 is in the OFF state and the relay contact 7 is in the ON state with two or more of the AC loads 3, 4, 5 being connected, the discharging operation 1 is selected. The operation of the discharging operation 1 is suitable for supplying power to the loads 3, 4, 5 from the DC power supply 1 (for example, the solar cell and storage battery) when the power system 2 is down.

On the other hand, when power is output only to the a-phase or b-phase, such as when only the AC load 3 or 4 of 100 V system is connected, the discharging operation 2 is selected. Compared to the discharging operation 1 in which four switching elements should be switched on and off, the discharging operation 2 allows only two switching elements to be switched on and off. Thus, the switching loss can be reduced.

Further, when power is output only to the ab-phase, such as when only AC load 5 of 200 V system is connected or during a system interconnection operation with the relay contact 6 in the ON state, the discharging operation 3 is selected. Compared to the discharging operation 1 in which four switching elements should be switched on and off, the discharging operation 3 allows only two switching elements to be switched on and off. Thus, the switching loss can be reduced.

Next, the selection method of the charging operations 1, 2, 3, 4 will be described. First, when different powers are input from both the a-phase and b-phase of the 100 V system to charge the DC power supply 1, the charging operation 1 is selected. On the other hand, when power is input from the a-phase or b-phase to charge the DC power supply 1, such as when the power supply of 100 V system is connected to the a-phase or b-phase, the charging operation 2 is selected. Further, when power is input from the ab-phase to charge the DC power supply 1, such as when the AC power of the 200 V system is connected to the ab-phase, the charging operation 3 or 4 is selected.

The charging operations 1, 2, 3, 4 are similar to the discharging operations 1, 2, 3. In other words, compared to the charging operations 1, 4 in which four switching elements should be switched on and off, the charging operations 2, 3 allow only two switching elements to be switched on and off. Thus, the switching loss can be reduced.

Note that when the DC power supply 1 is charged from the 100 V system power supply, it is also possible to connect the 100 V system power supply to the ab-phase in order to charge the DC power supply 1 by the charging operation 3. However, in the charging operation 3, the input current passes through two semiconductor devices, so that the conduction loss increases compared to the charging operation 2 in which the number of semiconductor devices such as switching elements and diodes that the input current passes through, is only one.

As described above, in the power supply unit according to the present invention, the switch S is fixed at the ON state to function as a single-phase three-wire inverter circuit, when the AC 100 V system and power are input and output such as during self-sustained operation. On the other hand, when only the AC 200 V system and power are input and output such as during system interconnection operation, the switch S is fixed at the OFF state to function as a single-phase two-wire inverter circuit. In this way, it is possible to reduce the power loss and increase the conversion efficiency.

As described above, in order to apply each of the charging/discharging operation modes by changing them accordingly, the control part 8 shown in FIG. 1 includes an input/output voltage configuration part to configure appropriate input/output voltages by the input operation of the user. In this case, the input/output voltages are the AC reference voltage (AC 100 V) and the double AC voltage (AC 200 V). Further, a charging/discharging configuration part is provided to specify either charge or discharge by the input operation of the user. Note that it is preferable to specify the input/output voltages in such a way that only the double AC voltage (AC 200 V) is specified, only the AC reference voltage (AC 100 V) is specified, and both the AC voltages are specified simultaneously.

Further, the control part 8 shown in FIG. 1 includes a program for opening and closing the relay contacts 6, 7 and the switch S based on the configuration information, and for performing the on/off control of a plurality of switching elements Q according to the specified mode.

Note that the solar cell and storage battery can be used as the DC power supply 1. It is also possible that the solar cell and storage battery are connected through a DC-DC converter. The DC power supply 1 may be connected in parallel between the terminals of the first capacitor C1 and/or the second capacitor C2 and/or the first capacitor leg. FIG. 1 shows an example in which the DC power supply 1 is connected in parallel between the terminals of the first capacitor leg.

What is claimed is:

1. A power supply unit comprising:
a first switching leg in which a first switching element and a second switching element are connected in series;
a second switching leg in which a third switching element and a fourth switching element are connected in series, while also being connected to the first switching leg in parallel;
a first capacitor leg in which a first capacitor and a second capacitor are connected in series, while also being connected to the first switching leg in parallel;
a second capacitor leg in which a third capacitor and a fourth capacitor are connected in series, with the series connection point of the third and fourth capacitors being connected to the series connection point of the first and second capacitors;
a first inductor connected between the series connection point of the first and second switching elements, and one end of the second capacitor leg;
a second inductor connected between the series connection point of the third and fourth switching elements, and the other end of the second capacitor leg; and
a control part for controlling the on/off state of the first to fourth switching elements,
wherein a DC power supply is connected in parallel to the first capacitor and/or the second capacitor and/or the first capacitor leg,
wherein one end of the second capacitor leg is defined as a first AC terminal, the other end of the second capacitor leg is defined as a second AC terminal, and the series connection point of the third and fourth capacitors is defined as a third AC terminal,
wherein a switch is inserted between the series connection point of the first and second capacitors, and the series connection point between the third and fourth capacitors,
wherein the control part sets the switch to the OFF state when power is output only between the first and second AC terminals of the second capacitor leg.

2. A power supply unit according to claim 1,
wherein the control part sets the switch to the ON state, when power is output either between the first and third AC terminals of the second capacitor leg, or between the third and second AC terminals of the second capacitor leg.

3. A power supply unit according to claim 1,
wherein the control part sets the switch to the ON state, when power is input and output between the first and third AC terminals of the second capacitor leg, between the third and second AC terminals of the second capacitor leg, and between the first and second AC terminals of the second capacitor leg.

4. A power supply unit according to claim 1,
wherein the AC power supply and/or the AC load is connected through a relay contact from the first AC terminal, the second AC terminal, and the third AC terminal.

5. A power supply unit according to claim 1,
wherein the control part sets the switch to the OFF state, when power is input from the two ends of the second capacitor leg and when power is not input from the two ends of the third capacitor and/or the two ends of the fourth capacitor.

6. An operation method of a power supply unit comprising:
a first switching leg in which a first switching element and a second switching element are connected in series;
a second switching leg in which a third switching element and a fourth switching element are connected in series, while also being connected to the first switching leg in parallel;
a first capacitor leg in which a first capacitor and a second capacitor are connected in series, while also being connected to the first switching leg in parallel;
a second capacitor leg in which a third capacitor and a fourth capacitor are connected in series, with the series connection point of the third and fourth capacitors being connected to the series connection point of the first and second capacitors;
a first inductor connected between the series connection point of the first and second switching elements, and one end of the second capacitor leg;
a second inductor connected between the series connection point of the third and fourth switching elements, and the other end of the second capacitor leg; and
a control part for controlling the on/off state of the first to fourth switching elements,
wherein a DC power supply is connected in parallel to the first capacitor and/or the second capacitor and/or the first capacitor leg, wherein one end of the second capacitor leg is defined as a first AC terminal, the other end of the second capacitor leg is defined as a second AC terminal, and the series connection point of the third and fourth capacitors is defined as a third AC terminal,
wherein a switch is connected between the series connection point of the first and second capacitors, and the series connection point of the third and fourth capacitors,
wherein the control part fixes the switch at the OFF state,
wherein the control part maintains one switching element of either one of the first and second switching legs in the ON state, while maintaining the switching element of the other switching leg in the OFF state,
wherein the control part sets the two series switching elements of the other switching leg to the ON state and to the OFF state, alternately.

7. An operation method of a power supply unit according to claim 6,
wherein the control part performs a mode c1 for setting the switching element on the positive terminal side of the first switching leg, as well as the switching element on the negative terminal side of the second switching leg to the ON state, while setting the other switching elements to the OFF state,
wherein the control part performs a mode c2 for setting the switching element on the positive terminal side of the first switching leg, as well as the switching element on the positive terminal side of the second switching leg to the ON state, while setting the other switching elements to the OFF state,
wherein the control part performs the modes c1 and c2 alternately.

8. An operation method of a power supply unit according to claim 6,
wherein the control part performs a mode C1 for setting the switching element on the negative terminal side of the first switching leg, as well as the switching element on the negative terminal side of the second switching leg to the ON state, while setting the other switching elements to the OFF state,
wherein the control part performs a mode C2 for setting the switching element on the positive terminal of the first switching leg, as well as the switching element on the negative terminal side of the second switching leg to the ON state, while setting the other switching elements to the OFF state,
wherein the control part performs the modes C1 and C2 alternately.

9. An operation method of a power supply unit according to claim 6,
wherein the control part fixes the switch at the ON state to alternately operate the switching elements of either of the first and second switching legs, while setting the switching elements of the other switching leg to the OFF state.

10. An operation method of a power supply unit according to claim 9,
wherein the control part performs a mode b1 for setting the switching element on the positive terminal side of the first switching leg to the ON state, while setting the other switching element to the OFF state,
wherein the control part performs a mode b2 for setting the switching element on the negative terminal side of the first switching leg to the ON state, while setting the other switching element to the OFF state,
wherein the control part performs the mode b1 and b2 alternately.

11. An operation method of a power supply unit according to claim 9,
wherein the control part performs a mode B1 for setting the switching element on the negative terminal side of the first switching leg to the ON state, while setting the other switching element to the OFF state,
wherein the control part performs a mode B2 for setting the switching element on the positive terminal side of the first switching leg to the ON state, while setting the other switching element to the OFF state,
wherein the control part performs the mode B1 and B2 alternately.

12. An operation method of a power supply unit according to claim 6,
wherein the control part fixes the switch at the ON state to alternately repeat the state in which the switching element on the positive terminal side of either one of the first and second switching legs, as well as the switching element on the negative terminal side of the other switching leg are set to the ON state while the other switching elements are set to the OFF state, and the state in which the switching element on the positive terminal side of the other switching leg, as well as the switching element on the negative terminal side of the remaining switching leg are set to the ON state while the other switching elements are set to the OFF state.

13. An operation method of a power supply unit according to claim 12,
wherein the control part performs a mode a1 for setting the switching element on the positive terminal side of the first switching leg, as well as the switching element on the negative terminal side of the second switching leg to the ON state, while setting the other switching elements are to the OFF state,
wherein the control part performs a mode a2 for setting the switching element on the negative terminal side of the first switching leg, as well as the switching element on the positive terminal side of the second switching leg to the ON state, while setting the other switching elements to the OFF state,
wherein the control part performs the modes a1 and a2 alternately.

14. An operation method of a power supply unit according to claim 12,
wherein the control part performs a mode A1 for setting the switching element on the negative terminal side of the first switching leg, as well as the switching element on the positive terminal side of the second switching leg to the ON state, while setting the other switching elements to the OFF state,
wherein the control part performs a mode A2 for setting the switching element on the positive terminal side of the first switching leg, as well as the switching element on the negative terminal side of the second switching leg to the on state, while setting the other switching elements to the OFF state,
wherein the control part performs the modes A1 and A2 alternately.

15. A power supply unit comprising:
a first switching leg in which a first switching element and a second switching element are connected in series;
a second switching leg in which a third switching element and a fourth switching element are connected in series, while also being connected to the first switching leg in parallel;
a first capacitor leg in which a first capacitor and a second capacitor are connected in series, while also being connected to the first switching leg in parallel;
a second capacitor leg in which a third capacitor and a fourth capacitor are connected in series, with the series connection point of the third and fourth capacitors being connected to the series connection point of the first and second capacitors;
a first inductor connected between the series connection point of the first and second switching elements, and one end of the second capacitor leg;
a second inductor connected between the series connection point of the third and fourth switching elements, and the other end of the second capacitor leg; and
a control part for controlling the on/off state of the first to fourth switching elements,
wherein a DC power supply is connected in parallel to the first capacitor and/or the second capacitor and/or the first capacitor leg,
wherein a switch is inserted between the series connection point of the first and second capacitors, and the series connection point of the third and fourth capacitors,
wherein the control part sets the switch to the ON state, when power is input/output between the two ends of the third capacitor and/or when power is output between the two ends of the fourth capacitor; and
wherein the control part sets the switch to the OFF state, when power is output between the two ends of the second capacitor leg, and when power is not input between the two ends of the third capacitor and/or between the two ends of the fourth capacitor.

16. A power supply unit comprising:
a first switching leg in which a first switching element and a second switching element are connected in series;
a second switching leg in which a third switching element and a fourth switching element are connected in series, while also being connected to the first switching leg in parallel;
a first capacitor leg in which a first capacitor and a second capacitor are connected in series, while also being connected to the first switching leg in parallel;
a second capacitor leg in which a third capacitor and a fourth capacitor are connected in series, with the series connection point of the third and fourth capacitors being connected to the series connection point of the first and second capacitors;
a first inductor connected between the series connection point of the first and second switching elements, and one end of the second capacitor leg;
a second inductor connected between the series connection point of the third and fourth switching elements, and the other end of the second capacitor leg; and
a control part for controlling the on/off state of the first to fourth switching elements,
wherein a DC power supply is connected in parallel to the first capacitor and/or the second capacitor and/or the first capacitor leg,
wherein a switch is inserted between the series connection point of the first and second capacitors, and the series connection point of the third and fourth capacitors,
wherein the control part sets the switch to the ON state, when power is input/output between the two ends of the third capacitor and/or when power is output between the two ends of the fourth capacitor; and
wherein the control part sets the switch to the OFF state, when power is input between the two ends of the second capacitor leg, and when power is not input between the two ends of the third capacitor and/or between the two ends of the fourth capacitor.

17. A power supply unit comprising:
a first switching leg in which a first switching element and a second switching element are connected in series;
a second switching leg in which a third switching element and a fourth switching element are connected in series, while also being connected to the first switching leg in parallel;
a first capacitor leg in which a first capacitor and a second capacitor are connected in series, while also being connected to the first switching leg in parallel;
a second capacitor leg in which a third capacitor and a fourth capacitor are connected in series, with the series connection point of the third and fourth capacitors being connected to the series connection point of the first and second capacitors;
a first inductor connected between the series connection point of the first and second switching elements, and one end of the second capacitor leg;

a second inductor connected between the series connection point of the third and fourth switching elements, and the other end of the second capacitor leg; and a control part for controlling the on/off state of the first to fourth switching elements, wherein a DC power supply is connected in parallel to the first capacitor and/or the second capacitor and/or the first capacitor leg, wherein a switch is inserted between the series connection point of the first and second capacitors, and the series connection point of the third and fourth capacitors, wherein the two ends of the second capacitor leg as well as the series connection point of the third and fourth capacitors are defined as AC terminals, wherein a single-phase and three-wire AC power supply system is connected to the AC terminals so that a neutral line is connected to the series connection point of the third and fourth capacitors, wherein the control part sets the switch to the OFF state for interconnection with the single-phase three-wire AC power supply system.

18. A power supply unit according to claim 17, wherein a relay is provided between the AC terminals and the single-phase three-wire AC power supply system, wherein the control part sets the switch to the ON state, when the relay is blocked and when power is supplied to the load connected to the AC terminal.

19. A power supply unit comprising:

a first switching leg in which a first switching element and a second switching element are connected in series;

a second switching leg in which a third switching element and a fourth switching element are connected in series, while also being connected to the first switching leg in parallel;

a first capacitor leg in which a first capacitor and a second capacitor are connected in series, while also being connected to the first switching leg in parallel;

a second capacitor leg in which a third capacitor and a fourth capacitor are connected in series, with the series connection point of the third and fourth capacitors being connected to the series connection point of the first and second capacitors;

a first inductor connected between the series connection point of the first and second switching elements, and one end of the second capacitor leg;

a second inductor connected between the series connection point of the third and fourth switching elements, and the other end of the second capacitor leg; and a control part for controlling the on/off state of the first to fourth switching elements, wherein a DC power supply is connected in parallel to the first capacitor and/or the second capacitor and/or the first capacitor leg, wherein a switch is inserted between the series connection point of the first and second capacitors, and the series connection point of the third and fourth capacitors, wherein the control part sets the switch to the ON state, when power is input/output between the two ends of the third capacitor and/or when power is output between the two ends of the fourth capacitor; and wherein, when the switch is set to the OFF state, the control part switches the switching element of either of the first and second switching legs in synchronization with the cycle of the AC power that is input/output between the two ends of the third capacitor, while switching the switching element of the other one of the first and second switching legs, with a cycle shorter than the cycle of the AC power that is input/output between the two ends of the third capacitor.

20. A power supply unit comprising:

a first switching leg in which a first switching element and a second switching element are connected in series;

a second switching leg in which a third switching element and a fourth switching element are connected in series, while also being connected to the first switching leg in parallel;

a first capacitor leg in which a first capacitor and a second capacitor are connected in series, while also being connected to the first switching leg in parallel;

a second capacitor leg in which a third capacitor and a fourth capacitor are connected in series, with the series connection point of the third and fourth capacitors being connected to the series connection point of the first and second capacitors;

a first inductor connected between the series connection point of the first and second switching elements, and one end of the second capacitor leg;

a second inductor connected between the series connection point of the third and fourth switching elements, and the other end of the second capacitor leg; and a control part for controlling the on/off state of the first to fourth switching elements, wherein a DC power supply is connected in parallel to the first capacitor and/or the second capacitor and/or the first capacitor leg, wherein a switch is inserted between the series connection point of the first and second capacitors, and the series connection point of the third and fourth capacitors, wherein the control part sets the switch to the ON state, when power is input/output between the two ends of the third capacitor and/or when power is output between the two ends of the fourth capacitor; and wherein the control part switches the first and second switching elements on and off, when the switch is set to the ON state and when power is input/output between the two ends of the third capacitor, wherein the control part switches the third and fourth switching elements on and off, when the switch is set to the ON state and when power is input/output between the two ends of the fourth capacitor.

21. A power supply unit comprising:

a first switching leg in which a first switching element and a second switching element are connected in series;

a second switching leg in which a third switching element and a fourth switching element are connected in series, while also being connected to the first switching leg in parallel;

a first capacitor leg in which a first capacitor and a second capacitor are connected in series, while also being connected to the first switching leg in parallel;

a second capacitor leg in which a third capacitor and a fourth capacitor are connected in series, with the series connection point of the third and fourth capacitors being connected to the series connection point of the first and second capacitors;

a first inductor connected between the series connection point of the first and second switching elements, and one end of the second capacitor leg;

a second inductor connected between the series connection point of the third and fourth switching elements, and the other end of the second capacitor leg; and a control part for controlling the on/off state of the first to fourth switching elements, wherein a DC power supply is connected in parallel to the first capacitor and/or the second capacitor and/or the first capacitor leg, wherein a switch is inserted between the series connection point of the first and second capacitors, and the series connection point of the third and fourth capacitors, wherein the control part sets the switch to the ON state, when power is input/output between the two ends of the third capacitor and/or when power is output between the two ends of the fourth capacitor; and wherein the power supply unit comprises:

a third switching leg in which a fifth switching element and a sixth switching element are connected in series, while also being connected in parallel to the first switching leg; and a third inductor connected between the series connection point of the fifth and sixth switching elements, and the series connection point of the first and second capacitors.

22. A power supply unit according to claim 21, wherein diodes are connected in inverse-parallel to the first to sixth switching elements.

23. A power supply unit according to claim 17 wherein the control part sets the switch to the OFF state, when power is input between the two ends of the second capacitor leg and when power is not input between the two ends of the third capacitor and/or between the two ends of the fourth capacitor.

\* \* \* \* \*